United States Patent [19]

Takanashi et al.

[11] Patent Number: 5,185,617
[45] Date of Patent: Feb. 9, 1993

[54] METHOD OF INFORMATION CONVERSION AND APPARATUS THEREOF

[75] Inventors: Itsuo Takanashi, Kamakura; Shintaro Nakagaki, Miura; Ichiro Negishi; Tsutou Asakura, both of Yokohama, all of Japan

[73] Assignee: Victor Company of Japan, Ltd., Yokohama, Japan

[21] Appl. No.: 633,223

[22] Filed: Dec. 24, 1990

[30] Foreign Application Priority Data

Dec. 26, 1989 [JP] Japan ................... 1-337171

[51] Int. Cl.[5] .............................................. H04N 1/21
[52] U.S. Cl. .................................... 346/108; 358/296
[58] Field of Search ................. 346/108, 107 R, 76 L, 346/160; 358/296, 300, 302

[56] References Cited

U.S. PATENT DOCUMENTS

| | | | |
|---|---|---|---|
| 4,445,125 | 4/1984 | Scifres et al. | 346/108 |
| 4,445,126 | 4/1984 | Tsukada | 346/108 |
| 4,554,561 | 11/1985 | Daniele et al. | 346/108 |
| 4,796,038 | 1/1989 | Allen et al. | 346/108 |
| 4,945,423 | 7/1990 | Takanashi et al. | 358/300 |

OTHER PUBLICATIONS

"Dynamic Micromechanics on Silicon: Techniques and Devices", IEEE Trans. on Electron Devices, vol. ED-25, No. 10, Oct., 1978.

Primary Examiner—Mark J. Reinhart
Attorney, Agent, or Firm—Michael N. Meller

[57] ABSTRACT

A method of information conversion in which a recording medium is composed of a photoconductive member and a photo-modulation member both exhibiting a photoelectric effect and a dielectric mirror interposed therebetween, laminated to each other. An electro-magnetic radiation beam intensity-modulated with a serial information to be converted is radiated to the photoconductive member. The radiated beam is deflected straight along a surface of the photoconductive member to form a charge image composed of electric charges having an electric charge quantity corresponding to the information, as arranged in a straight line in a region on a border between the photoconductive member and dielectric mirror, corresponding to a region of the photoconductive member to which the beam is radiated. A two-dimensional bundle of electro-magnetic radiation beams of constant intensity and covering the region on the border is radiated to the recording medium at the photo-modulation member side thereof to take out a two-dimensional bundle of electro-magnetic radiation beams exhibiting intensity variation subjected to the charge image due to the photoelectric effect from the recording medium.

7 Claims, 8 Drawing Sheets

5,185,617

METHOD OF INFORMATION CONVERSION AND APPARATUS THEREOF

BACKGROUND OF THE INVENTION

The present invention relates to a method of information conversion and an apparatus thereof which are applicable to a display apparatus, a printer and an optical computer, etc.

Widely known is a display apparatus of varying configuration for obtaining a two-dimensional image by projecting a beam of light, whose intensity is modulated with serial information signals, on a screen via an optical projection system.

However, it has been impossible to obtain an optical two-dimensional image of high luminance and resolution such as a two-dimensional image of a resolution of 4000×4000 pixels at almost real time in such a conventional apparatus in which an optical signal whose intensity is modulated with each pixel signal in a video signal, since there has been no signal conversion device to realize it.

SUMMARY OF THE INVENTION

An object of the present invention is to provide a method of information conversion and an apparatus thereof for obtaining an optical two-dimensional image of high luminance and resolution.

According to the present invention there is provided a method of information conversion. Firstly, a recording medium is composed of a photoconductive member and photo-modulation member both exhibiting a photoelectric effect and a dielectric mirror interposed therebetween, laminated to each other.

An electro-magnetic radiation beam intensity-modulated with a serial information to be converted is radiated to the photoconductive member.

The radiated beam is deflected straight along a surface of the photoconductive member to form a charge image composed of electric charges having an electric charge quantity corresponding to the information, as arranged in a straight line in a region on a border between the photoconductive member and dielectric mirror, corresponding to a region of the photoconductive member to which the beam is radiated.

And a two-dimensional bundle of electro-magnetic radiation beams of constant intensity and covering the region on the border is radiated to the recording medium at the photo-modulation member side thereof to take out a two-dimensional bundle of electro-magnetic radiation beams exhibiting intensity variation subjected to the charge image due to the photoelectric effect from the recording medium.

Accordingly, the present invention is advantageous in that a two-dimensional image of high luminance and resolution is easily obtained.

The other objects and features of the present invention will become understood from the following description with reference to the accompanying drawings.

DETAILED DESCRIPTION OF THE PREFERRED EMBODIMENTS

Figure 1:
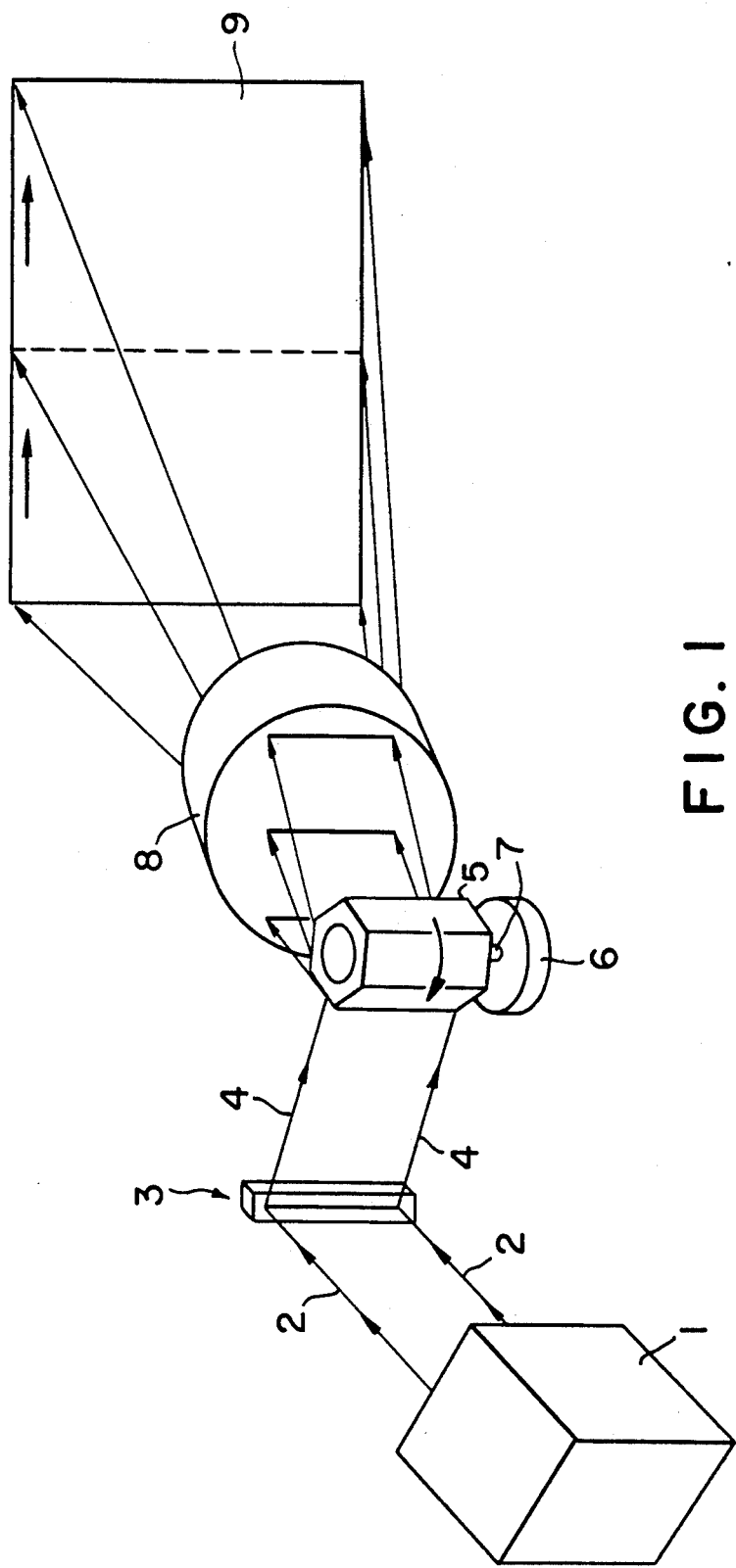
FIG. 1 is a block diagram of basic configuration of a display apparatus to which a method of information conversion according to the present invention is applied.

The present invention will now be described in detail with reference to the accompanying drawings. Throughout the drawings, like reference numerals and letters are used to designate like or equivalent elements for the sake of simplicity of explanation.

FIG. 1 is a block diagram of basic configuration of a display apparatus to which a method of information conversion according to the present invention is applied. The display apparatus comprises light source 1 which may have a xenon arc lamp, photo-modulation device 3, polygon mirror 5, projection lens 8 and screen 9.

The light source 1 emits a plane beam 2 which is then incident to the photo-modulation device 3. A "plane beam" means a beam in a sheet form which has a linear cross section cut by a plane perpendicular to the propagating direction of the beam.

The device 3 modulates the plane beam 2 to a plane beam 4 whose optical intensity varies pixel by pixel in the direction of a straight line.

The plane beam 4 is then emitted by the photo-modulation device 3 and is incident to the polygon mirror 5. The mirror 5 is mounted on a rotary shaft 7 of a motor 6 and is rotated at a specific rotating speed by the motor 6.

The plane beam 4 thus incident to the polygon mirror 5 is deflected in a horizontal direction at a specific cycle. Deflected plane beams are incident to the projection lens 8 which projects the deflected plane beams onto a screen 9 to obtain a two-dimensional image thereon.

Next, a detailed configuration of the photo-modulation device 3 will be described with reference to FIGS. 2, 4 and 5. First, in FIG. 2, the photo-modulation device 3 comprises a pair of substrates 10 and 16, and an electrode 11, a photoconductive layer (abbreviated as PCL hereinafter) member 12, a dielectric mirror 13, a photo-modulation layer (abbreviated as PML hereinafter) member 14 and an electrode 15 laminated in order therebetween.

The substrates 10 and 16 may be composed of a transparent substrate such as a glass plate and a synthetic resin plate. The electrodes 11 and 15 are composed of a thin film of transparent conductive a substance. The PCL member 12 is composed of substance which exhibits photoconductivity in the range of optical wavelength to be used. The dielectric mirror 13 may be a conventional one composed of a multi-layer film which reflects a beam of a specific wavelength.

Furthermore, the PML member 14 may be composed of a photo-modulation member, such as nematic liquid crystal, lithium niobate, bismuth silicon oxide, lead lanthanum zirconate titanate and a film of polymer-dispersed liquid crystal, which changes the optical state of a beam (the optical state of the angle of polarization plane, rotary polarization or scattering) in response to a field intensity applied thereto.

A power supply 17 applies a specific a.c. voltage across the electrodes 11 and 15. Here, the power supply 17 is an a.c. power supply but it may be a d.c. power supply depending on the component substance of the PML member 14.

A beam of light 18 for information-writing (abbreviated as writing light 18 hereinafter) whose intensity is modulated with an information signal to be displayed is incident to the PCL member 12.

Figure 3:
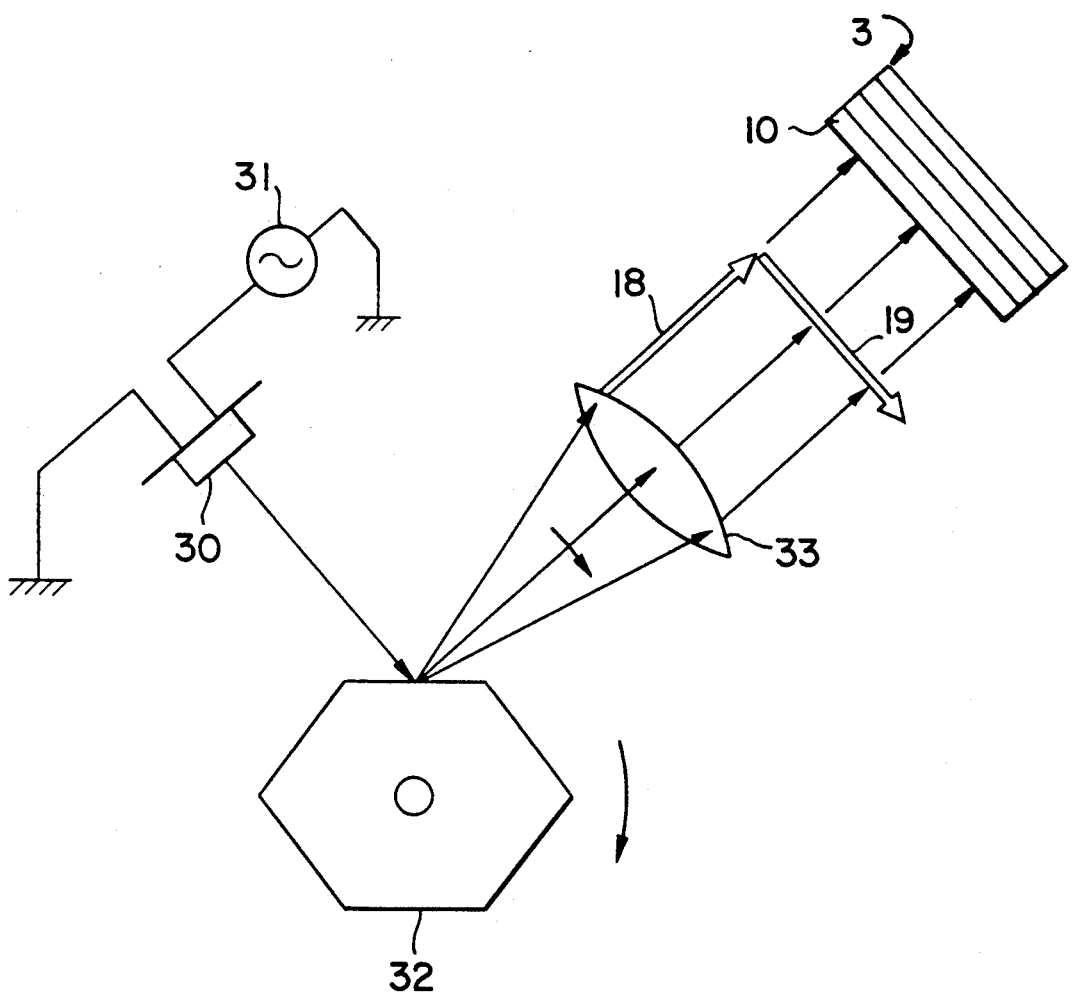
FIG. 3 is a block diagram of means for emitting a writing light to the photo-modulation device shown in FIG. 2.

As shown in FIG. 3, a beam of light is emitted by a laser light source A (or a light emitting diode array) 30 which is intensity-modulated by a serial signal source 31.

The beam is deflected by a deflector 32 such as a polygon mirror rotated by a motor (not shown). The deflected beam is passed through a lens 33 to become the writing light 18 which scans in a direction depicted by an arrow 19.

Figure 2:
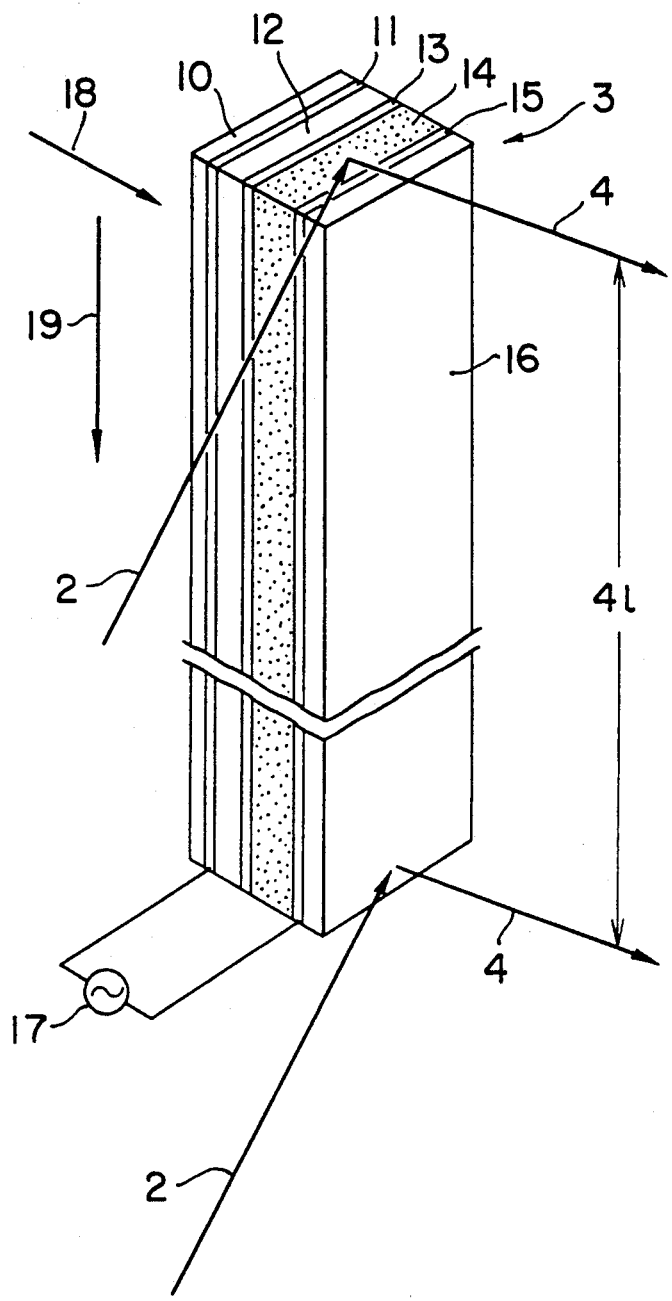
FIGS. 2, 4 and 5 are perspective views of a configuration of a photo-modulation device applied to the display device shown in FIG. 1.

Again in FIG. 2, the writing light 18 deflected in the direction of the arrow 19 scans the PCL member 12 straight in that direction.

Accordingly, when the writing light 18 is incident to the PCL member 12, the electrical resistance of the portion thereof where the writing light 18 is converged varies in response to a quantity of the light. A charge image in the form of a straight line corresponding to the quantity of the light is therefore formed on the border between the PCL member 12 and dielectric mirror 13.

The charge image is formed such that electric charges respectively corresponding to sequential pixel signals in a serial signal are arranged in a longitudinal direction of the charge image. An electric field is thus induced by the charge image and is applied to the PML member 14.

When a plane beam of light 2 for information-reading (abbreviated as in a reading light 2) is incident to the substrate 16 under the state described above, the reading light 2 reaches the dielectric mirror 13 via the electrode 15 and PML member 14 and is reflected at the mirror 13 and is then emitted from the substrate 16 as a plane beam 4 via the PML member 14 and electrode 15.

The angle of polarization along the plane beam varies in a longitudinal direction along a length 41 in response to sequential pixel signals in the serial signal.

The optical intensity of the plane beam 4 varies in the direction of the length 41 in response to the sequential pixel signals if the component material of the PML member 14 has the characteristic that it changes the scattering state of light passing therethrough in response to a field intensity applied thereto.

On the other hand, the angle of polarization plane or rotary polarization of the plane beam 4 varies in response to the sequential pixel signals if the component material of the PML member 14 has the characteristic that it changes the angle of polarization plane or rotary polarization of a light passing therethrough in response to a field intensity applied thereto.

In the case where the angle of polarization plane or rotary polarization of the plane beam 4 varies, the plane beam 4 is passed through an analyzer so that its optical intensity varies in the direction of the length 41 in response to the sequential pixel signals.

Figure 4:
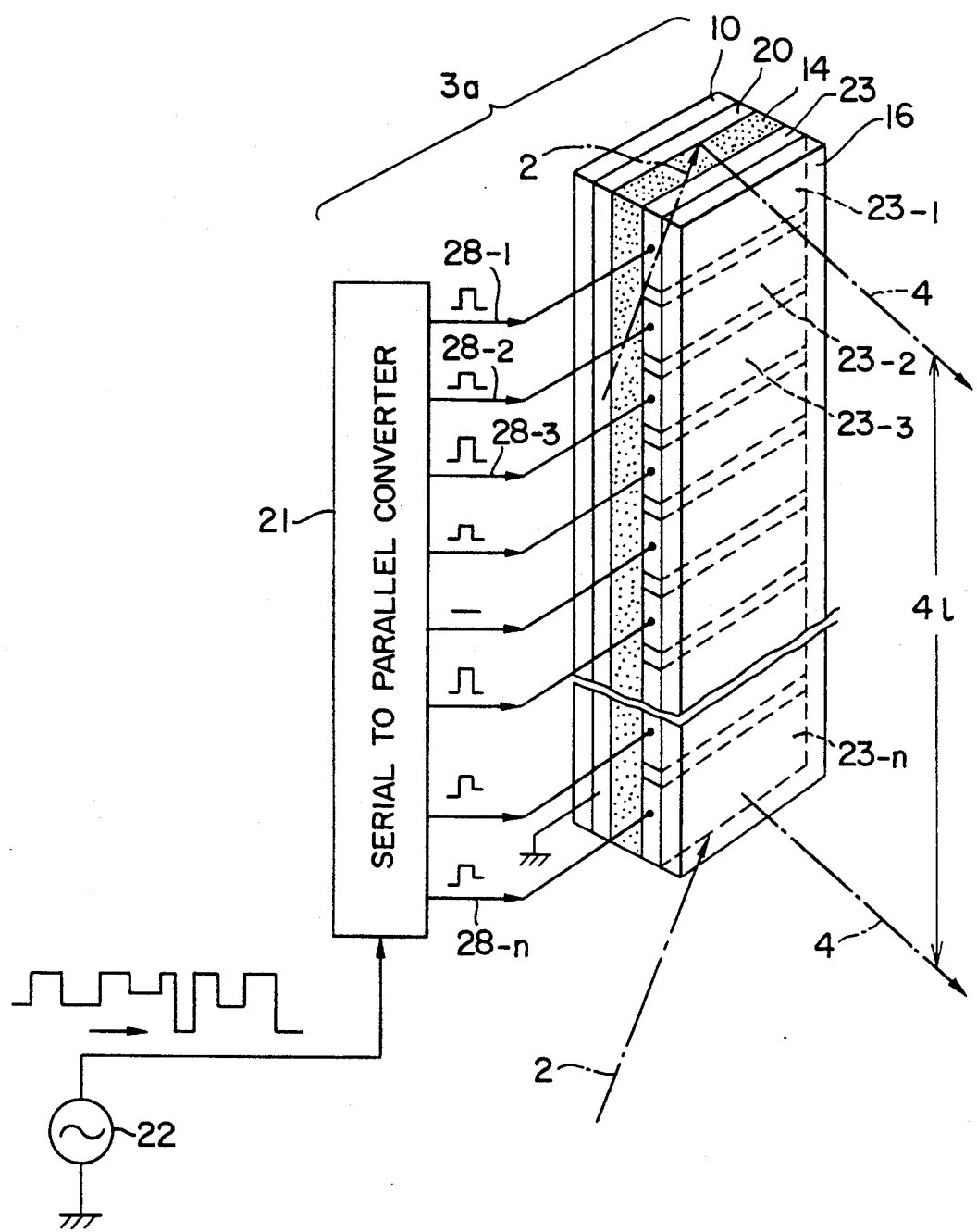

Next, in FIG. 4, a photo-modulation device 3a is constructed such that a reflecting electrode 20 (an electrode for reflecting light), PML member 14, and an electrode array 23 composed of divided electrodes $23_{-1}$, $23_{-2}$, $23_{-3}$, ... and $23_{-n}$ are laminated in order between substrates 10 and 16. Connected to the photo-modulation device 3a are a serial to parallel signal converter 21 such as a shift register and power supply 22.

When the power supply 22 feeds a video signal composed of a serial signal to be displayed to the converter 21, pixel signals arranged on the time base of the video signal are simultaneously applied to the divided electrodes $23_{-1}$, $23_{-2}$, $23_{-3}$, ... and $23_{-n}$ via lines $28_{-1}$, $28_{-2}$, $28_{-3}$, ... and $28_{-n}$ respectively.

A charge image pattern corresponding to each of the pixel signals is therefore formed on the divided electrodes $23_{-1}$, $23_{-2}$, $23_{-3'}$ ... and $23_{-n}$ so that an electric field corresponding to the charge image pattern is applied to the PML member 14.

When the plane reading light 2 is incident to the substrate 16, the reading beam 2 reaches the reflecting electrode 20 via the substrate 16, electrode 23 and PML member 14 and is reflected at the reflecting electrode 20 and further is emitted from the substrate 16 as the plane beam 4 via the PML member 14 and electrode 23.

The optical intensity of the plane beam 4 varies in the direction of the length 41 in response to sequential pixel signals in the serial signal for the same reason as explained with reference to FIG. 2.

Whether the optical intensity or angle of polarization or rotary polarization of the plane beam 4 varies in the direction of the length 41 in response to the sequential pixel signals depends on the same facts as explained with reference to FIG. 2.

When the plane beam 4 is incident to an analyzer (not shown), the optical intensity of the plane beam 4 varies in the direction of the length 41 corresponding to the sequential pixel signals.

Figure 5:
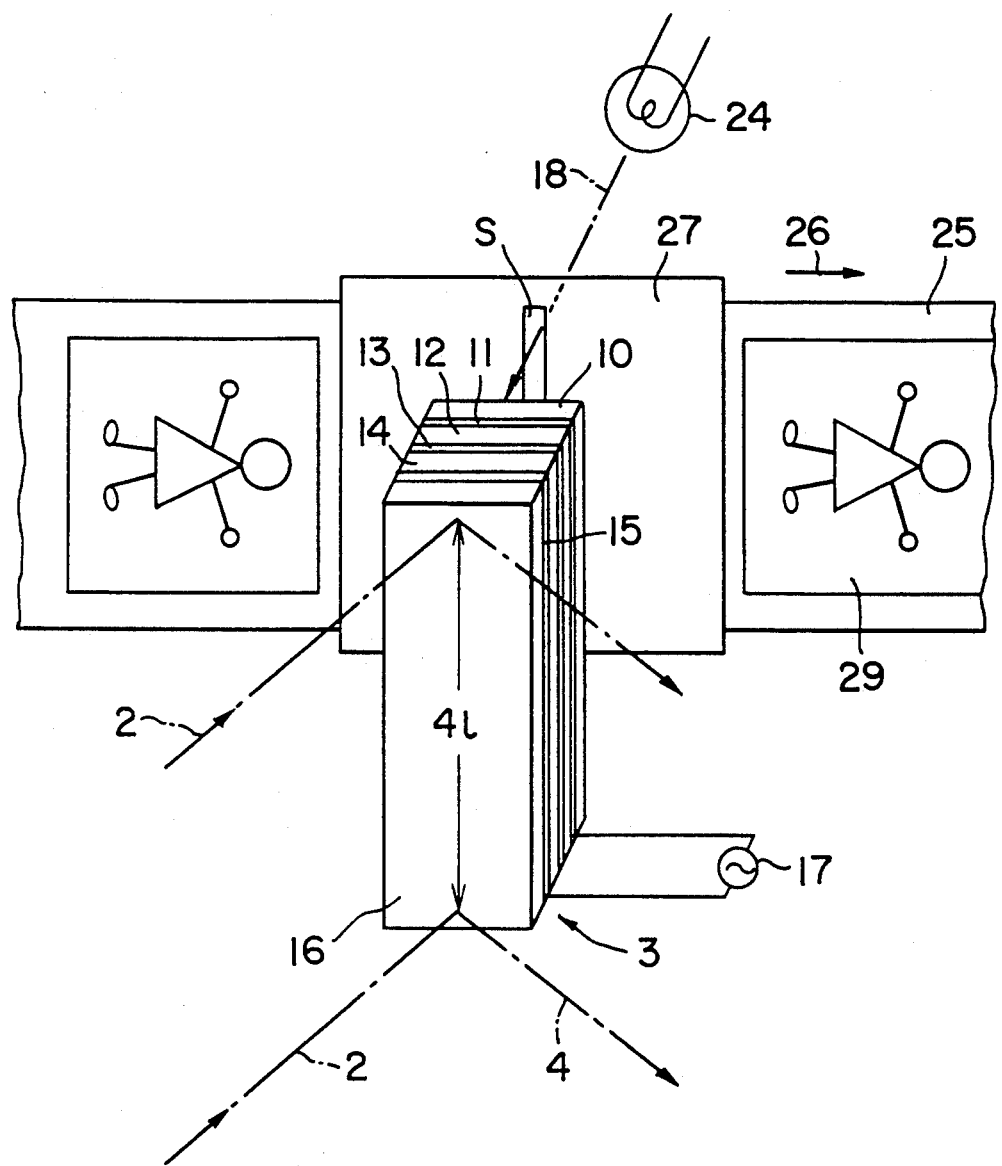

The photo-modulation device 3 shown in FIG. 5 is constructed in the same manner as that of FIG. 2. A recording medium 25 is prerecorded with a two-dimensional image 29 and is transferred in the direction of an arrow 26 behind a slit board 27. A light source 24 emits the writing light 18 to the recording medium 25 via a converging lens (not shown) which includes a cylindrical lens to allow a light radiated only into a slit S of the slit board 27.

The writing light 18 whose intensity is modulated in response to a straight line portion cut from a two-dimensional image to be displayed is formed into a plane beam. The plane beam passes through the slit S and is converged onto the PCL member 12 via the substrate 10 and electrode 11.

The electric resistance of the portion of the PCL member 12 where the writing light 18 is converged varies in response to the quantity of the writing light 18. A charge image is thus formed in a straight line in the vicinity of the border of the PCL member 12 and dielectric mirror 13.

This results in electric charges of the charge image corresponding to sequential images being arranged in a longitudinal direction of the charge image. An electric field is therefore applied to the PML member 14 due to the charge image.

When the plane reading light 2 is incident to the substrate 16, the reading light 2 reaches the dielectric mirror 13 via the electrode 15 and PML member 14 and is reflected at the dielectric mirror 13 and further is emitted from the substrate 16 as the plane beam 4 via the PML member 14 and electrode 15.

The optical intensity of the plane beam 4 varies in response to sequential images arranged in the direction of the length 41 of the reading light 2.

Whether the optical intensity or angle of polarization or rotary polarization of the plane beam 4 varies in the direction of the length 41 in response to the sequential pixel signals on the serial signals depends on the same facts as explained with reference to FIG. 2.

Furthermore, when the plane beam 4 is incident to an analyzer (not shown), the optical intensity of the plane beam 4 varies in the direction of the length 41 in response to the sequential pixel signals also as explained with reference to FIG. 2.

The PML member 14 may be composed of electro-chromic material whose transmission density varies in response to an electric field applied thereto.

If the PML member 14 composed of the material which changes angle of polarization or rotary polarization is used, an analyzer for demodulating the optical intensity of the light emitted from the photo-modulation device 3 in response to the image and a wave-plate for applying an optical bias across the analyzer and PML member 14 (both not shown) may be provided.

Figure 6:
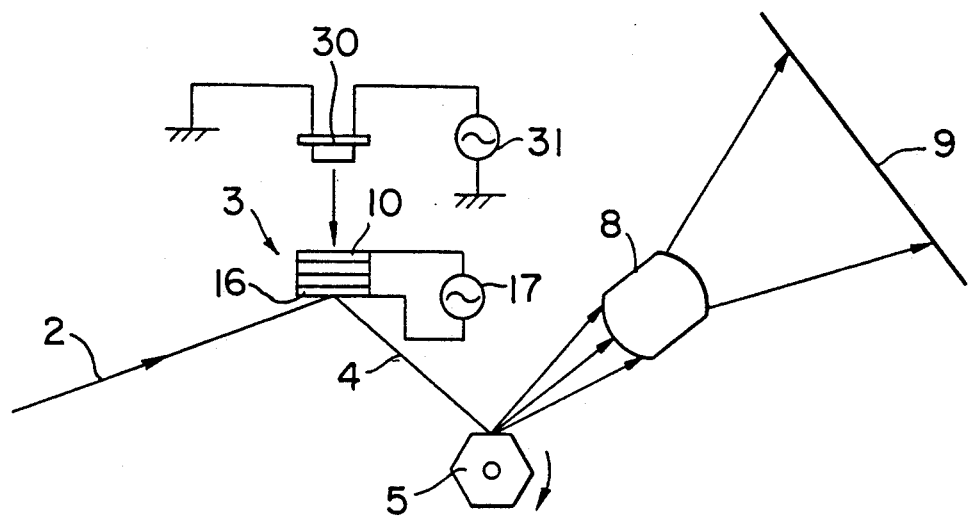
FIGS. 6 to 8 are block diagrams of the main component parts of the display device shown in FIG. 1.
Figure 7:
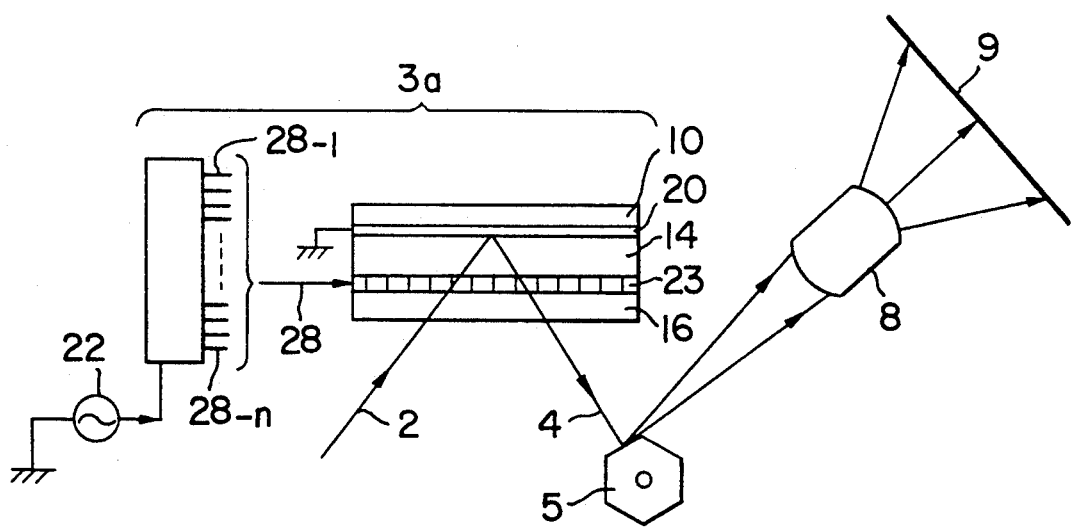
Figure 8:
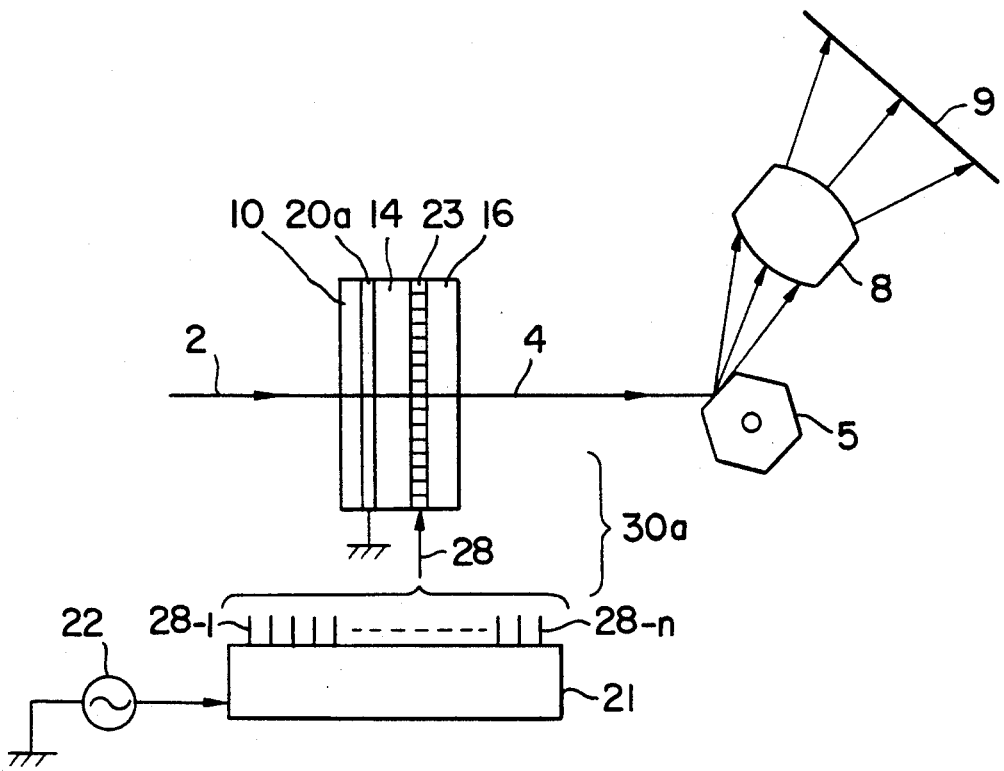

Next, FIGS. 6 to 8 respectively show the configuration of a display apparatus in which the photo-modulation device 3 produces a beam of light whose intensity is modulated in response to pixels arranged in the direction of a straight line of a plane beam and the beam is incident to the polygon mirror 5 in which the beam is deflected and is projected onto the screen 9 via the projection lens 8.

Firstly, FIG. 6 is an example in which the laser light source 30 (or a light-emitting diode) applies a laser beam, whose intensity is modulated with a signal to be displayed, to the same photo-modulation device 3 as shown in FIG. 2 to form a charge image in a straight line corresponding to sequential pixels and then the charge image read out therefrom by the reading light 2 is delfected by the polygon mirror 5.

Next, FIG. 7 is an example of an arrangement of the same photo-modulation device 3a as shown in FIG. 4 in a display apparatus.

FIG. 8 is further an example of an arrangement in a display apparatus in which a photo-modulation device 30a identical to the device 3a shown in FIG. 4 except that the device 30a is of a light-transmission type using a transparent electrode 20a instead of the reflecting electrodes 20.

As for the means for deflecting the beam emitted from the photo-modulation device 3, not only a polygon mirror, but also a galvano mirror or any other deflection means may be used.

Above embodiments are the examples in which the present invention is applied to a display apparatus for a monochrome image.

Figure 9:
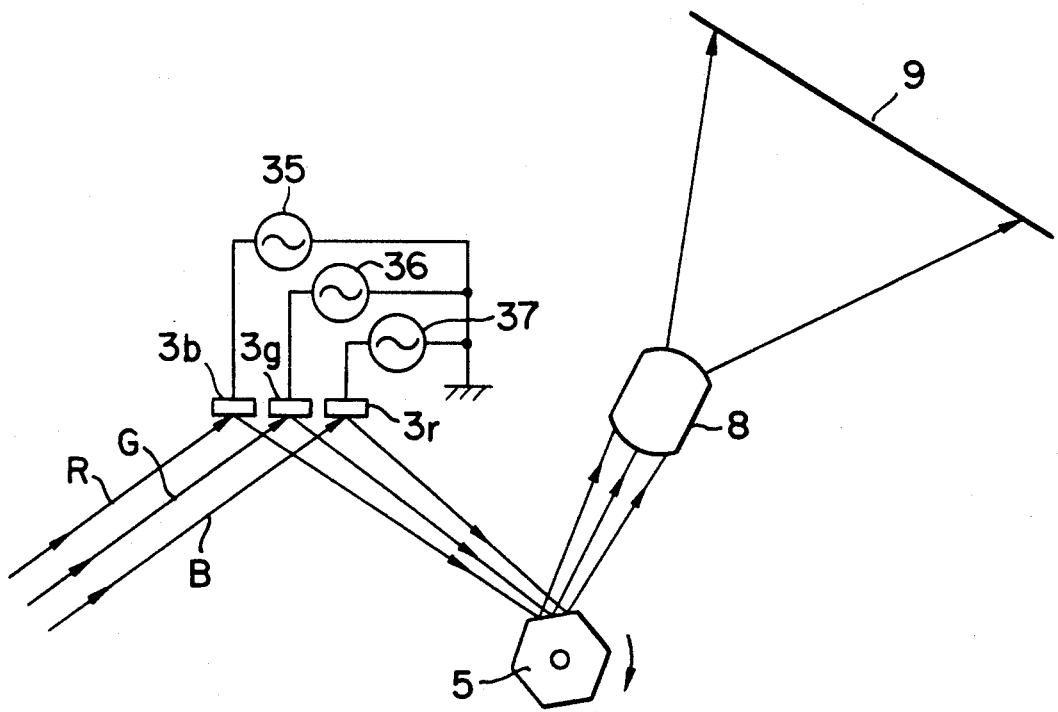
FIG. 9 shows a block diagram of the main component parts of a display apparatus for a color image to which the method of information conversion according to the present invention is applied.

However, the present invention may be applied to a display apparatus for a color image. FIG. 9 is such an example. In FIG. 9, the display apparatus for a colour image comprises a photo-modulation device 3r used for red, a photo-modulation device 3g for green and a photo-modulation device 3b for blue. The devices 3r, 3g and 3b have the same configuration as shown in FIG. 4. Also provided are a signal source 35 for a blue signal, a signal source 36 for a green signal and a signal source 37 for a red signal.

Serial to parallel signal converters provided for the devices 3r, 3g and 3b simultaneously feed pixel signals, in color image signals applied from the signal sources 35, 36 and 37, to divided electrodes in the devices 3r, 3g and 3b to form charge images thereon corresponding to the arrangement of the pixel signals. The distribution of an electric field induced by the charge images is therefore applied to photo-modulation members of the photo-modulation device 3r, 3g and 3b, respectively.

A plane red beam R is incident to the device 3r, a plane green beam G is incident to the device 3g and a plane blue beam B is incident to the device 3b. The plane color beams to intensity of each of which is modulated according to pixel arrangement on a straight line, are emitted from the devices 3r, 3g and 3b and are incident to the polygon mirror 5.

The polygon mirror 5 deflects the plane color beams which are then applied to the projection lens 8. The plane color beams are therefore projected on the screen 9 via the projection lens 8 to display a color two-dimensional image on the screen 9.

Figure 10:
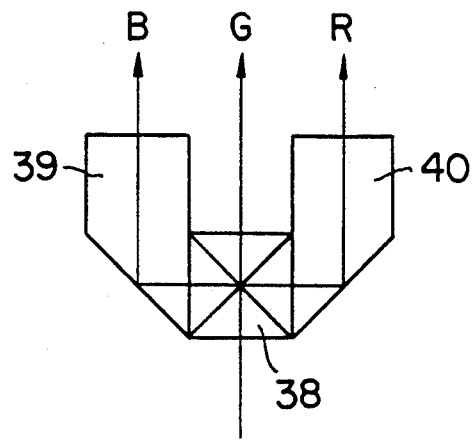
FIGS. 10 to 13 show means for producing plane beams R, G and B used in the embodiment shown in FIG. 9.

The plane beams R, G and B are produced by means such as shown in FIGS. 10 to 13. FIG. 10 shows an apparatus composed of a dichroic prism 38 and optical-path members 39 and 40 for producing primary color beams R, G and B.

Figure 11:
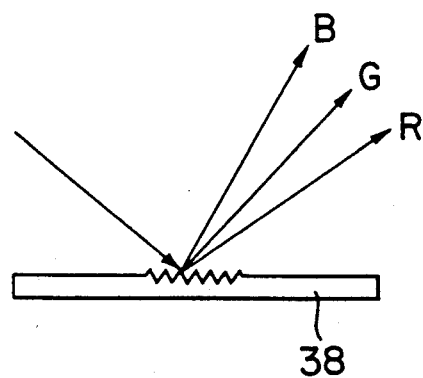

FIG. 11 shows an apparatus for producing primary color beams R, G and B by separating a beam of light with a grating 41.

Figure 12:
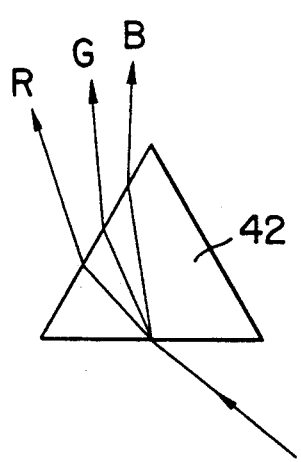
Figure 13:
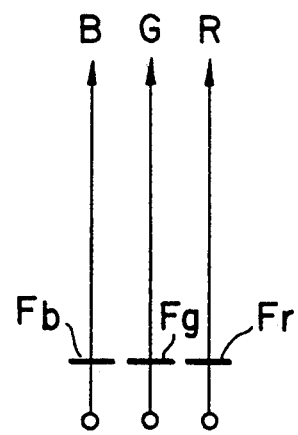

FIG. 12 shows an apparatus for producing primary color beams R, G and B by separating a beam of light with a prism 42. Furthermore, FIG. 13 shows an apparatus for producing primary color beams R, G and B by separating beams of light with a transparent filter Fr for red, transparent filter Fg for green and transparent filter Fb for blue.

The preferred embodiments according to the present invention disclosed above are for display apparatus. The information obtained by way of the method according to the present invention may be applied as a writing information and to a recording/reproduction apparatus, a printer and an optical computer.

What is claimed is:

1. A method of information conversion, comprising the steps of:
    composing a recording medium of a photoconductive member and a photo-modulation member both exhibiting a photoelectric effect and a dielectric mirror interposed therebetween, laminated to each other;
    radiating an electro-magnetic radiation beam intensity-modulated with a serial information to be converted to the photoconductive member;
    deflecting straight the radiated beam along a surface of the photoconductive member to form a charge image composed of electric charges having an electric charge quantity corresponding to the information, as arranged in a straight line in a region on a border between the photoconductive member and dielectric mirror, corresponding to a region of the photoconductive member to which the beam is radiated; and
    radiating a two-dimensional bundle of electro-magnetic radiation beams of constant intensity and covering the region on the border to the recording medium at the photo-modulation member side thereof to take out a two-dimensional bundle of electro-magnetic radiation beams exhibiting variation subjected to the charge image due to the photoelectric effect from the recording medium.

2. A method of information conversion, comprising the steps of:
   composing a recording medium of an electrode, a photo-modulation member exhibiting a photoelectric effect and a transparent electrode array of a plurality of transparent divided electrodes arranged in a straight line, laminated to each other in order;
   applying simultaneously components, at each moment, of a serial electric signal to be converted, obtained by serial to parallel conversion, to each of the divided electrodes to produce an electric field having an intensity distribution corresponding to the electric signal to the photo-modulation member; and
   radiating a two-dimensional bundle of electro-magnetic radiation beams of constant intensity and converting the divided electrodes to the recording medium at the transparent electrode side thereof to take out a two-dimensional bundle of electro-magnetic radiation beams exhibiting intensity variation subjected to the electric field due to the photoelectric effect from the recording medium.

3. An apparatus for information conversion, comprising:
   a recording medium composed of a photoconductive member and a photo-modulation member both exhibiting a photoelectric effect and a dielectric mirror interposed therebetween, laminated to each other;
   radiation means for radiating an electro-magnetic radiation beam intensity-modulated with a serial information to be converted to the photoconductive member;
   formation means for deflecting straight the radiated beam along a surface of the photoconductive member to form a charge image composed of electric charges having an electric charge quantity corresponding to the information, as arranged in a straight line in a region on a border between the photoconductive member and dielectric mirror, corresponding to a region of the photoconductive member to which the beam is radiated; and
   taking means for radiating a two-dimensional bundle of electro-magnetic radiation beams of constant intensity and covering the region on the border to the recording medium at the photo-modulation member side thereof to take out a two-dimensional bundle of electro-magnetic radiation beams exhibiting intensity variation subjected to the charge image due to the photoelectric effect from the recording medium.

4. The apparatus according to claim 1, wherein the radiation means is provided with a laser light source.

5. The apparatus according to claim 1, wherein the radiation means is provided with a light emitting diode array.

6. An apparatus for information conversion, comprising:
   a recording medium composed of an electrode, a photo-modulation member exhibiting a photoelectric effect and a transparent electrode array of a plurality of transparent divided electrodes arranged in a straight line, laminated to each other in order;
   production means for applying simultaneously components, at each moment, of a serial electric signal to be converted, obtained by serial to parallel conversion, to each of the divided electrodes to produce an electric field having an intensity distribution corresponding to the electric signal to the photo-modulation member; and
   taking means for radiating a two-dimensional bundle of electro-magnetic radiation beams at constant intensity and covering the divided electrodes to the recording medium at the transparent electrode side thereof to take out a two-dimensional bundle of electro-magnetic radiation beams exhibiting intensity variation subjected to the electric field due to the photoelectric effect from the recording medium.

7. The apparatus according to claim 6, wherein the production means is provided with a shift register for serial to parallel conversion.

* * * * *